United States Patent [19]

Axelrod

[11] 4,066,611

[45] Jan. 3, 1978

[54] STABILIZED POLYCARBONATE COMPOSITION

[75] Inventor: Robert Jay Axelrod, Glenmont, N.Y.

[73] Assignee: General Electric Company, Pittsfield, Mass.

[21] Appl. No.: 698,807

[22] Filed: June 23, 1976

[51] Int. Cl.$^2$ .................. C08G 63/62; C08K 5/52; C08K 5/54
[52] U.S. Cl. .................. 260/45.8 A; 260/2.5 R; 260/18 TN; 260/45.7 R; 260/45.7 PH; 260/77.5 D; 260/927 R
[58] Field of Search .................. 260/45.7 PH, 45.8 A, 260/45.7 R

[56] References Cited

U.S. PATENT DOCUMENTS

| | | | |
|---|---|---|---|
| 2,847,443 | 8/1958 | Hechenbleikner et al. | 260/927 R |
| 3,039,993 | 6/1962 | Friedman | 260/45.8 |
| 3,281,381 | 10/1966 | Hechenbleikner et al. | 260/45.7 PH |
| 3,305,520 | 2/1967 | Fritz et al. | 260/45.7 PH |
| 3,489,716 | 1/1970 | Calkins | 260/45.8 A |
| 3,673,146 | 6/1972 | Factor | 260/45.8 A |
| 3,733,296 | 5/1973 | Cleveland et al. | 260/45.7 PH |

*Primary Examiner*—H.S. Cockeram
*Attorney, Agent, or Firm*—William F. Mufatti

[57] ABSTRACT

A stabilized polycarbonate composition comprising in admixture an aromatic carbonate polymer and a stabilizing amount of a cyclic diphosphite. The composition may additionally contain co-stabilizers such as epoxides or silanes.

9 Claims, No Drawings

STABILIZED POLYCARBONATE COMPOSITION

This invention is directed to a thermal oxidatively stable and hydrolytically stable polycarbonate composition comprising in admixture, an aromatic carbonate polymer and a stabilizing amount of a cyclic diphosphite. The composition may additionally contain co-stabilizers such as epoxides or silanes.

BACKGROUND OF THE INVENTION

In the past, much effort has been expended in preparing thermally stable polycarbonate compositions which would be color stable at elevated temperatures and particularly at the high molding temperatures generally employed to prepare molded polycarbonate articles. Many different additives have been found that are quite suitable for rendering polycarbonates heat and color stable. Particularly useful are triorgano phosphites which have been disclosed in U.S. Pat. No. 3,305,520. Also, U.S. Pat. No. 3,729,440 discloses a thermally stable aromatic polycarbonate containing a phosphinite and an epoxy compound. Also, the molded polycarbonate articles are used for producing bottles. These bottles become hazy after sterilization in water or moisture at elevated temperatures. U.S. Pat. No. 3,839,247 discloses a water clear polycarbonate composition containing an aromatic epoxy or an aliphatic epoxy compound as a stabilizer.

DESCRIPTION OF THE INVENTION

It has been discovered that when an aromatic carbonate polymer is admixed with a cyclic diphosphite or a cyclic diphosphite with an epoxide or a silane, the resulting polycarbonate has improved thermal-oxidative stability and hydrolytic stability. The resulting composition has resistance to yellowing when subjected to high molding temperatures and moisture as is employed in sterilization.

The cyclic diphosphite compounds are characterized by the following general formula:

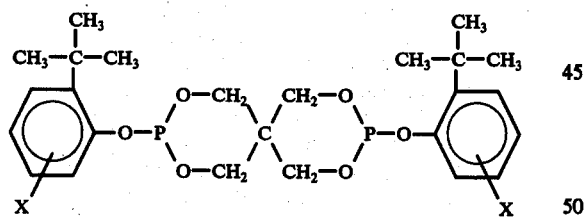

wherein X is selected from the group consisting of lower alkyl of 1 to 6 carbon atoms; aryl; alkaryl and aralkyl of 6 to 20 carbon atoms and halogen.

The preferred cyclic diphosphite is di-(2,4-di-t-butylphenyl) pentaerythrityl diphosphite of the following formula:

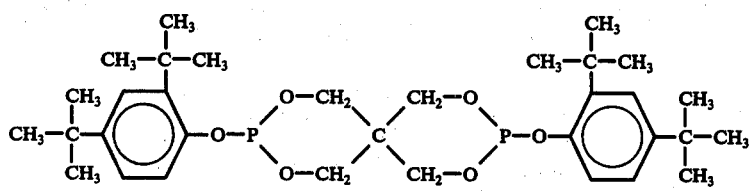

These cyclic diphosphite compounds are used in stabilizing amounts of from about 0.01 to about 0.10 weight percent.

The co-stabilizing silane compounds are of the general formula:

wherein R is independently selected from the group consisting of alkyl, alkoxy, aryl, aralkyl and arkaryl of 1 to 20 carbon atoms and wherein $a + b = 4$ and $b$ is an integer equal to or less than 3. Preferred silanes are alkoxy-substituted silanes while the most preferred silanes are triethoxy silane and diphenylethoxy silane.

These silanes are used in stabilizing amounts of from about 0.01 to about 0.10 weight percent.

The co-stabilizing epoxy compounds are selected from the following:

I. Derivatives of epoxy ethane represented by the following formula:

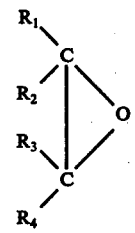

wherein $R_1$, $R_2$, $R_3$ and $R_4$ are independently selected from the group consisting of hydrogen, an alkyl radical of 1-24 carbon atoms, an aryl radical of 6–24 carbon atoms —$CH_2OR'$, —$CH_2OCOR'$, —$CH_2OCOR'X$, $'COOCH_2X$, $CH_2OR''OCH_2X$ wherein $R'$ is selected from the group consisting of an alkyl radical of 1–24 carbon atoms or an aryl radical of 6 to 24 carbon atoms and wherein $R''$ is an alkylene radical of 1–24 carbon atoms and X is an oxirane ring.

II. Derivatives of epoxy cyclohexane represented by the following formula:

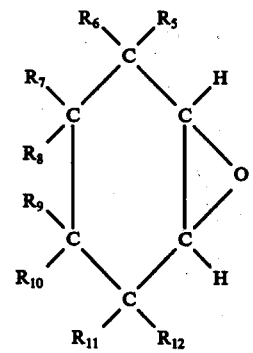

wherein $R_5$ through $R_{12}$ are independently selected from the group consisting of hydrogen, alkyl radicals of 1–24 carbon atoms, —COOR$_{13}$, —OCOR$_{13}$, —COOR$_{14}$X, —OCOR$_{14}$—COOX wherein R$_{13}$ is an alkyl radical of 1–24 carbon atoms and R$_{14}$ therein is an alkylene radical of 1–24 carbon atoms and X is an oxirane ring.

While the actual number of hydrogen atoms employed may vary, it should be a function of the volatility of the epoxy compound. The number of hydrogen atoms should be such as to minimize the volatility of the epoxy compound since if the epoxy compound were to volatize at a low temperature, its benefit in use with a polycarbonate would be lost at the molding temperatures employed in preparing molded articles from the composition of this invention.

The amount of epoxy employed in the practice of this invention can vary from 0.01 to 0.5 weight percent based on the weight of the polymer composition and is preferably 0.03 to 0.10 weight percent. While more than 0.5 weight percent of epoxy can be employed, it has been found that higher amounts tend to degrade the physical properties of the polycarbonate and thereby reduce the usefulness of the polymer in providing tough, flexible molded articles.

In the practice of this invention, other epoxy compounds that have been employed in place of the 3,4-epoxy-cyclohexylmethyl 3,4-epoxy cyclohexane carboxylate with essentially the same results as those set forth previously as encompassed by the formula I and II and are 3,4-epoxy-6-methylcyclohexylmethyl, 3,4-epoxy-6-methylcyclohexane carboxylate, 2,3-epoxycyclohexylmethyl, 3,4-epoxycyclohexane carboxylate, 4-(3,4-epoxy-5-methylcyclohexyl) butyl 3,4-epoxycyclohexane carboxylate, 3,4-epoxy-cyclohexyl ethylene oxide, cyclohexyl 3,4-epoxy-cyclohexane carboxylate, 3,4-epoxy-6-methylcyclohexylmethyl-6-methylcyclohexyl carboxylate, bisphenol-A diglycidyl ether, tetrabromobisphenol-A diglycidyl ether, diglycidyl ester of phthalic acid, diglycidyl ester of hexahydro phthalic acid, epoxidized soybean oil, epoxidized linseed oil, bis-epoxycyclohexyl adipate, butadiene diepoxide, tetraphenylethylene epoxide, octyl epoxy tallate and epoxidized polybutadiene. Also, 3,4-dimethyl-1,2-epoxycyclohexane, 3,5-dimethyl-1,2-epoxy cyclohexane, 3-methyl-5-tert butyl-1,2-epoxy cyclohexane, octadecyl 2,2-dimethyl-3,4-epoxy cyclohexane carboxylate, N-butyl 2,2-dimethyl-3,4-epoxy cyclohexane carboxylate, cyclohexyl 2-methyl-3,4-epoxy cyclohexane carboxylate, N-butyl 2-isopropyl-3,4-epoxy-5-methylcyclohexane carboxylate, octadecyl-3,4-epoxy cyclohexane carboxylate, 2 ethyl hexyl 3',4' epoxy cyclohexane carboxylate, 4,6-dimethyl 2,3 epoxy cyclohexyl 3',4'-epoxy cyclohexane carboxylate, diethyl 4,5-epoxy-cis-1,2 cyclohexane dicarboxylate, di-n-butyl 3-tert butyl-4,5-epoxy-cis-1,2 cyclohexane dicarboxylate. Specifically, any of the epoxycyclohexyl compounds meet the general formula of II and the other epoxy compounds recited herein meet the general formula of I. Preferably, the epoxy compound employed in the practice of this invention is 3,4-epoxy-cyclohexylmethyl 3,4-epoxy cyclohexane carboxylate.

The aromatic carbonate polymers employed in the practice of this invention are homopolymers and copolymers and mixtures thereon that are prepared by reacting a dihydric phenol with a carbonate precursor.

The dihydric phenols that can be employed are bisphenols such as bis(4-hydroxyphenyl) methane, 2,2-bis(4-hydroxyphenol) propane (hereinafter referred to as bisphenol-A), 2,2-bis(4-hydroxy-3-methylphenyl) propane, 4,4-bis(4-hydroxyphenyl) heptane, 2,2-bis(4-hydroxy-3,5-dichlorophenyl) propane, 2,2-bis(4-hydroxy-3,5-dibromophenyl) propane, etc.; dihydric phenol ethers such as bis(4-hydroxyphenyl) ether, bis(3,5-dichloro-4-hydroxyphenyl) ether, etc.; dihydroxydiphenyls such as p,p'-dihydroxydiphenyl, 3,3'-dichloro-4,4'-dihydroxydiphenyl, etc.; dihydroxyaryl sulfones such as bis(4-hydroxyphenyl) sulfone, bis(3,5-dimethyl-4-hydroxyphenyl) sulfone, etc.; dihydroxy benzenes, resorcinol, hydroquinone, halo- and alkyl-substituted dihydroxy benzenes such as 1,4-dihydroxy-2,5-dichlorobenzene, 1,4-dihydroxy-3methylbenzene, etc.; and dihydroxy diphenyl sulfoxides such as bis(4-hydroxyphenyl) sulfoxide, bis(3,5-dibromo-4-hydroxyphenyl) sulfoxide, etc. A variety of additional dihydric phenols are also available to provide carbonate polymers and are disclosed in U.S. Pat. Nos. 2,999,835, 3,028,365 and 3,153,008. Also suitable for preparing the aromatic carbonate polymers are copolymers prepared from any of the above copolymerized with halogen-containing dihydric phenols such as 2,2-bis(3,5-dichloro-4-hydroxyphenyl) propane, 2,2-bis(3,5-dibromo-4-hydroxyphenyl) propane, etc. It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be empolyed herein are diphenyl carbonate, di-(halophenyl) carbonates such as di(chlorophenyl carbonate, di-(bromophenyl) carbonate, di-(trichlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention are prepared by employing a molecular weight regulator, an acid acceptor and a catalyst. The molecular weight regulators which can be employed in carrying out the process of this invention include monohydric phenols such as phenol, chroman-I, paratertiary-butylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate or an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, n,n-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polycarbonate and a branched polycarbonate.

Obviously, other materials can also be employed with the aromatic carbonate polymer of this invention and include such materials as antistatic agents, mold release agents, thermal stabilizers, ultraviolet light stabilizers, reinforcing fillers such as glass and other inert fillers, foaming agents and the like.

DESCRIPTION OF THE PREFERRED EMBODIMENT

The following examples are set forth to illustrate more clearly the principle and practice of this invention to those skilled in the art. Unless otherwise specified, where parts or percents are mentioned, they are parts or percents by weight.

EXAMPLE I

A polycarbonate composition of a homopolymer of 2,2-bis(4-hydroxyphenyl) propane, (hereinafter referred to as bisphenol-A) prepared by reacting essentially equimolar amounts of bisphenol-A and phosgene in an organic medium with triethylamine, sodium hydroxide, and phenol, under standard conditions is mixed with 0.07 weight percent of 2,3-epoxycyclohexylmethyl 3,4-epoxycyclohexane carboxylate and 0.03 weight percent of decylphenyl phosphite (two commonly employed stabilizers). This composition is then fed to an extruder, which extruder is operated at about 550° F, and the extrudate strands are dropped into pellets. The pellets are injection molded into test samples of about 3 inches by 2 inches by ⅛ inch thick at 600° F, 650° F and 700° F. The composition is designated as Sample A. Thermal stability to discoloration is measured in accordance with ASTM Yellowness Index Test D1925 on samples molded at 600° F, 650° F and 700° F. These results are set forth in Table I. Further, samples molded at 600° F are heat aged at 140° C and the Yellowness Index measured. These results are given in Table II. Additionally, the samples as molded are subjected to ASTM test method D1003 for determining light transmission on the samples before and after steam autoclaving at 250° F. These results are set forth in Table III.

EXAMPLE II

Example I is repeated except that 0.03 weight percent of a cyclic diphosphite of the following formula:

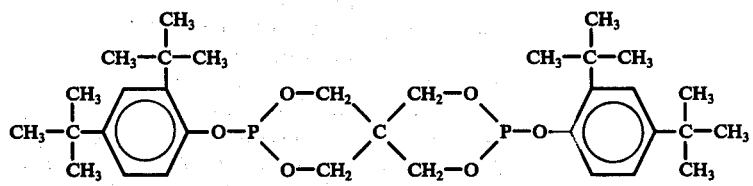

is employed herein in place of the decylphenyl phosphite. This composition is designated Sample B. The pellets produced from this composition are injection molded and subjected to the tests as described in Example I. The results are tabulated in Tables I, II and III.

EXAMPLE III

Example I is repeated except that both 0.03 weight percent of the cyclic diphosphite of Example II and 0.03 weight percent of triethoxy silane are employed in place of the 2,3-epoxycyclohexylmethyl 3,4-epoxycyclohexane carboxylate and decylphenyl phosphite. This composition is designated Sample C. The pellets produced from this composition are injection molded and subjected to the tests as described in Example I. The results are tabulated in Tables I, II and III.

EXAMPLE IV

Example I is repeated except that 0.03 weight percent of the cyclic diphosphite of Example II is employed in place of the 2,3-epoxycyclohexylmethyl-3,4-epoxycyclohexane carboxylate and decylphenyl phosphite. This composition is designated Sample D. The pellets produced from this composition are injection molded and subjected to the tests as described in Example I. The results are tabulated in Table I, II and III.

TABLE I

| Sample | Yellowness Index as Molded at | | |
|---|---|---|---|
| | 600° F | 650° F | 700° F |
| A | 0.6 | 2.4 | Brown |
| B | 0.8 | 2.0 | 11.8 |
| C | 1.1 | 1.4 | 7.3 |
| D | 0.5 | 1.2 | 8.9 |

TABLE II

| | Yellowness Index for Samples Molded at 600° F and Heat Aged at 140° C for the following days: | | |
|---|---|---|---|
| Sample | As Molded | 7 Days | 11 Days |
| A | 0.6 | 4.5 | 7.1 |
| B | 0.8 | 2.8 | 4.5 |
| C | 1.1 | 4.7 | 6.8 |
| D | 0.5 | 3.2 | 5.0 |

TABLE III

| Sample | % Light Transmission before Autoclaving | % Light Transmission After Autoclaving (Time in Days) | | | | | |
|---|---|---|---|---|---|---|---|
| | | 1 | 2 | 3 | 4 | 5 | 6 |
| A | 86.4 | 84.3 | 74.6 | 29.5 | 5.5 | 2.9 | — |
| B | 85.6 | 84.8 | 84.3 | 83.7 | 83.1 | 81.9 | 81.8 |
| C | 85.6 | 82.0 | 78.5 | 61.8 | 34.2 | 10.7 | — |
| D | 85.4 | 84.3 | 83.5 | 82.3 | 77.5 | 57.6 | 60.3 |

As regards the data in Tables I and II, the lower the Yellowness Index number, the lower is the discoloration of the polymer and, therefore, the better is the thermal stability of the polymer. Regarding Table III, the higher the percent light transmission, the lower is the degradation of the polymer by hydrolysis.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A stabilized polycarbonate composition comprising in admixture, an aromatic carbonate polymer and a stabilizing amount of a cyclic diphosphite characterized by the following general formula:

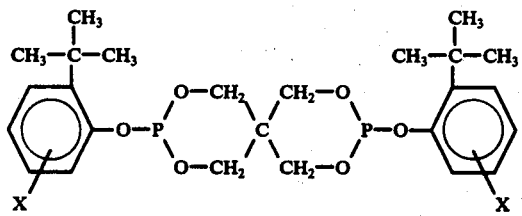

wherein X is selected from the group consisting of lower alkyl of 1 to 6 carbon atoms; aryl, alkaryl and aralkyl of 6 to 20 carbon atoms and halogen.

2. The composition as defined in claim 1 wherein the cyclic diphosphite is used in amounts of from 0.01 to about 0.10 weight percent.

3. The composition as defined in claim 1 wherein the cyclic diphosphite is di-(2,4-di-t-butylphenyl) pentaerythrityl diphosphite.

4. The composition as defined in claim 1 which contains a stabilizing amount of a silane compound of the general formula:

$R_a Si(OR)_b$ 

wherein R is independently selected from the group consisting of alkyl, alkoxy, aryl, aralkyl and alkaryl of 1 to 20 carbon atoms and wherein $a + b = 4$ and $b$ is an integer equal to or less than 3.

5. The composition as defined in claim 4 wherein the silane is used in amounts of from 0.01 to about 0.10 weight percent based on the weight of the polycarbonate composition.

6. The composition as defined in claim 4 wherein the silane is triethoxy silane.

7. The composition as defined in claim 4 wherein the silane is diphenyl diethoxy silane.

8. The composition as defined in claim 1 which contains 0.01 to 0.5 weight percent based on the weight of the polymer composition of epoxy compounds selected from the following:

I. Derivatives of epoxy ethane represented by the following formula:

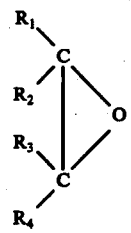

wherein $R_1$, $R_2$, $R_3$ and $R_4$ are independently selected from the group consisting of hydrogen, an alkyl radical of 1-24 carbon atoms, an aryl radical of 6-24 carbon atoms, —CH$_2$OR', —CH$_2$OCOR', —CH$_2$OCOR'X, 'COOCH$_2$X, CH$_2$OR"OCH$_2$X wherein R' is selected from the group consisting of an alkyl radical of 1-24 carbon atoms or an aryl radical of 6 to 24 carbon atoms and wherein R" is an alkylene radical of 1-24 carbon atoms and X is an oxirane ring.

II. Derivatives of epoxy cyclohexane represented by the following formula:

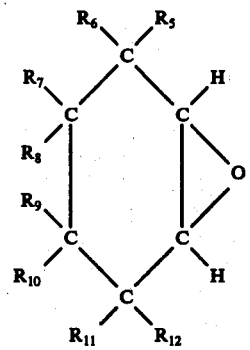

wherein $R_5$ through $R_{12}$ are independently selected from the group consisting of hydrogen, alkyl radicals of 1-24 carbon atoms, —COOR$_{13}$, —OCOR$_{13}$, —COOR$_{14}$X, —OCOR$_{14}$—COOX wherein R$_{13}$ is an alkyl radical of 1-24 carbon atoms and R$_{14}$ therein is an alkylene radical of 1-24 carbon atoms and X is an oxirane ring.

9. The composition as defined in claim 8 wherein the epoxy compound is 2,3-epoxycyclohexylmethyl 3,4-epoxycyclohexane carboxylate.

* * * * *